United States Patent [19]

Williams et al.

[11] Patent Number: 4,741,777

[45] Date of Patent: May 3, 1988

[54] DRY MIX FOR HIGH WORKABILITY STUCCOS AND MORTARS

[75] Inventors: Kenneth Williams; David L. Morris, both of Bedford, Ind.

[73] Assignee: Rockwall-Peerless Corp., Stucco and Mortar Products, Bedford, Ind.

[21] Appl. No.: 885,645

[22] Filed: Jul. 15, 1986

[51] Int. Cl.[4] ........................ C04B 24/20; C04B 24/28

[52] U.S. Cl. ........................................ 106/90; 106/314; 524/2; 524/5

[58] Field of Search ...................... 106/90, 314; 524/5, 524/2

[56] References Cited

U.S. PATENT DOCUMENTS

| | | | |
|---|---|---|---|
| 3,957,571 | 5/1976 | Bodycomb, Jr. | 427/215 |
| 4,164,426 | 8/1979 | Sinka et al. | 106/90 |
| 4,390,372 | 6/1983 | Hardin | 106/97 |
| 4,465,519 | 8/1984 | Hardin | 106/91 |

FOREIGN PATENT DOCUMENTS

| | | | |
|---|---|---|---|
| 55-56050 | 4/1980 | Japan | 524/5 |

*Primary Examiner*—Steven Capella
*Attorney, Agent, or Firm*—R. Stephen Hansell

[57] ABSTRACT

A dry composition including Portland cement, sand, fly ash Type F, with or without glass fiber, vinyl acetate-ethylene copolymer or equivalent powder form bonding agent, sodium salts of polymerized substituted benzoid alkyl sulfonic acids, or equivalent dispersing or emulsifying agent, and defoamer or antifoam agent or equivalent defoamer or antifoam agent, which is completely dry and controlled inplant.

4 Claims, No Drawings

DRY MIX FOR HIGH WORKABILITY STUCCOS AND MORTARS

BACKGROUND OF THE INVENTION

1. Field of the Invention: Dry Mortar composition with adhesive admixture for interior and exterior applications and lending itself to a variety of application methods.

2. Disclosure Statement: Standard dry pre-mixed mortars are well known, as are mortar additives which alter characteristics such as workability, slump, set time, strength, durability, resistance, and color, to name a few characteristics.

Organic surfactant additives are disclosed by several patents:

| U.S. Pat. No. | Issue Date | Inventor |
|---|---|---|
| 4,465,519 | 08/14/84 | Hardin |
| 4,390,372 | 06/28/83 | Hardin |
| 4,209,336 | 06/24/80 | Previte |
| 4,205,993 | 06/03/80 | Rosenberg, et alia |
| 4,164,426 | 08/14/79 | Sinka, et alia |
| 4,137,088 | 01/30/79 | Debus, et alia |
| 4,080,217 | 03/21/78 | Falioz, et alia |
| 3,769,051 | 10/30/73 | Hardin |
| 3,607,326 | 09/21/71 | Serafin |

Despite the selection of additives and range of combinations heretofore available, the search for a combination of constituents that provides the "optimum" mixture continues. In many cases, the addition of a constitutent to enhance one characteristic (e.g., workability) adversely affects or effects another characteristic (e.g., slump). The need for a "universal mix" is apparent because of the obvious economy of production, inventorying, and supplying, as well as the on-site production advantage of uniformity of material and selection of application technique to meet job requirements. To date, use of liquid polymers has impeded the creation of a completely dry mix which can be quality controlled in plant and constituted at the job site or any appropriate location as needed, particularly in the case of mixes designed for one-coat applications.

SUMMARY OF THE INVENTION

The present invention is a dry mortar composition comprised of Portland or equivalent cement and sand in a ratio of closely 1:3, with Fly ash Type F. Glass Fiber, Fiberglass or other filler (optional), vinyl acetate-ethylene copolymer (such as that supplied by the National Starch and Chemical Co.) or equivalent, sodium salts of polymerized substituted benzoid alkyl sulfonic acids, or equivalent, and Colloid 513DD or equivalent defoamer or antifoam agent. To the dry mix is added water or water/antifreeze as needed, usually at the job site, and the invention is applied by any appropriate method, including pouring, trowelling, screeding, rolling, slip forming, pumping, or by hydraulic hose or pressure gun. Applications include grouting, spackling, pool, architectural and sculpture applications, wearing surfaces, stucco cement, masonry construction, and structure member casting and repair.

The Portland Type I or II, white, domestic or imported cement can constituted up to 90% by weight of the mix. A vinyl acetate-ethylene, copolymer redispersible powder can constitute up to 25% of the mix by weight. Optional Fiberglass or polypropylene fiber strands, from $\frac{1}{8}$" to 1" in length can constitute up to 25% of the mix by weight. Said sodium salts of polymerized substituted benzoid alkyl sulfonic acids or other emulsifying agent effective with clays in powder form can constitute up to 8% of the mix by weight. For gun and pumping applications, optional defoamer or antifoam agent can comprise up to 10% of the mix. Fly ash Type F can constitute 30% of the total by weight.

White or manufactured sand can comprose up to 70% of the mix, and powdered calcium carbonate filler (of the same texture range as the sand, 20-200 mesh) can comprise up to 60% of the total mix.

By varying the proportion of the admixtures or by eliminating one or more admixture entirely, the mixture will produce stucco, one-coat stucco, masonry mortar, interior coatings, plastering compounds, patching compounds and grouting compounds.

DETAILED DESCRIPTION OF THE INVENTION

The present invention is a completely dry mortar mixture with excellent workability, the preferred embodiment of which contains Portland Cement, Type I or II, 23% by total weight; sand, 68.55%; Fly ash Type F, 6%; $\frac{1}{2}$" glass fiber, 1%; vinyl acetate-ethylene copolymer powder form, 1.25%; sodium salts of polymerized substituted benzoid alkyl sulfonic acids, 0.15%; defoamer or antifoam agent, 0.05%.

The mortar composition is dry mixed and shipped in bulk or in 40-100 pound bags to retailers or to job sites, where water and any additives are included in the mix.

The preferred hydraulic binder is Portland cement in a range of 20% to 70% by weight of dry mix. The composition exhibits excellent workability, improved tensile and flexural strength, improved handling and application, impact resistance, adhesional bond freezethat resistance, and flexibility.

We claim:

1. A dry mix mortar composition of 20% to 70% Portland cement by weight, 30% to 80% sand or fine aggregate by weight, 0.15% to 6% Fly ash Type F, 1% to 3% vinyl acetate-ethylene copolymer in powder form, 0.10% to 0.50% sodium salts of polymerized substituted benzoid alkyl sulfonic acids, and 0.05% to 0.15% defoamer or antifoam agent in dry form.

2. A dry mortar mix consisting of 23 lbs. of Portland cement, 69 lbs. of sand, 6 lbs. of Fly ash Type F, 1 lb. $\frac{1}{2}$" glass fiber, 1.25 lbs. vinyl acetate-ethylene copolymer in powder form, 0.05 lbs. sodium salts of polymerized substituted benzoid alkyl sulfonic acids and 0.05 lb. defoamer or antifoam agent in dry form.

3. The dry mortar mix of claim 2 wherein the glass fiber is replaced by one (1) lb. of sand.

4. The dry mortar mix of claim 2 wherein the amounts of Portland cement and the vinyl acetate-ethylene copolymer in powder form are doubled and $18\frac{1}{2}$ lbs. of calcium carbonate filler is added and the mixture is then mixed with sand in the ratio of one (1) unit mixture to two (2) units sand.

* * * * *